(12) United States Patent
Parsons et al.

(10) Patent No.: US 10,291,062 B2
(45) Date of Patent: May 14, 2019

(54) PORTABLE CHARGER AND POWER BANK

(71) Applicant: Armament Systems and Procedures, Inc., Appleton, WI (US)

(72) Inventors: Kevin Parsons, Appleton, WI (US); Yau Ngai Wang, Kowloon (HK)

(73) Assignee: Armament Systems and Procedures, Inc., Appleton, WI (US)

( * ) Notice: Subject to any disclaimer, the term of this patent is extended or adjusted under 35 U.S.C. 154(b) by 45 days.

(21) Appl. No.: 15/646,169

(22) Filed: Jul. 11, 2017

(65) Prior Publication Data
US 2019/0020217 A1 Jan. 17, 2019

(51) Int. Cl.
*H02J 7/00* (2006.01)
*H02J 7/14* (2006.01)
*H01R 24/58* (2011.01)
*H01R 24/62* (2011.01)
*H01R 107/00* (2006.01)
*H01R 103/00* (2006.01)
*H01R 24/38* (2011.01)

(52) U.S. Cl.
CPC ............ *H02J 7/1461* (2013.01); *H01R 24/58* (2013.01); *H02J 7/0045* (2013.01); *H02J 7/0047* (2013.01); *H01R 24/38* (2013.01); *H01R 24/62* (2013.01); *H01R 2103/00* (2013.01); *H01R 2107/00* (2013.01); *H01R 2201/26* (2013.01); *H02J 2007/005* (2013.01)

(58) Field of Classification Search
CPC ...... H02J 7/1461; H02J 7/0045; H02J 7/0047; H02J 2007/005; H01R 24/62; H01R 2103/00; H01R 2107/00; H01R 2201/26; H01R 24/38; H01R 24/58
See application file for complete search history.

(56) References Cited

U.S. PATENT DOCUMENTS

| 2013/0265747 A1* | 10/2013 | Liu | F21L 4/005 362/157 |
|---|---|---|---|
| 2014/0000638 A1* | 1/2014 | Sebastian | A24F 47/008 131/328 |
| 2014/0152257 A1* | 6/2014 | Miller | H02J 7/0042 320/111 |
| 2015/0194822 A1* | 7/2015 | Yueh | H02J 7/0054 320/107 |

* cited by examiner

*Primary Examiner* — Vuthe Siek
(74) *Attorney, Agent, or Firm* — Hahn Loeser & Parks LLP

(57) ABSTRACT

A portable charger and power bank that can be used to charge a battery and to charge a device. Power can be received through an automobile dashboard DC voltage receptacle or through a USB input port, and can be used to charge a device connected to a USB output port.

10 Claims, 4 Drawing Sheets

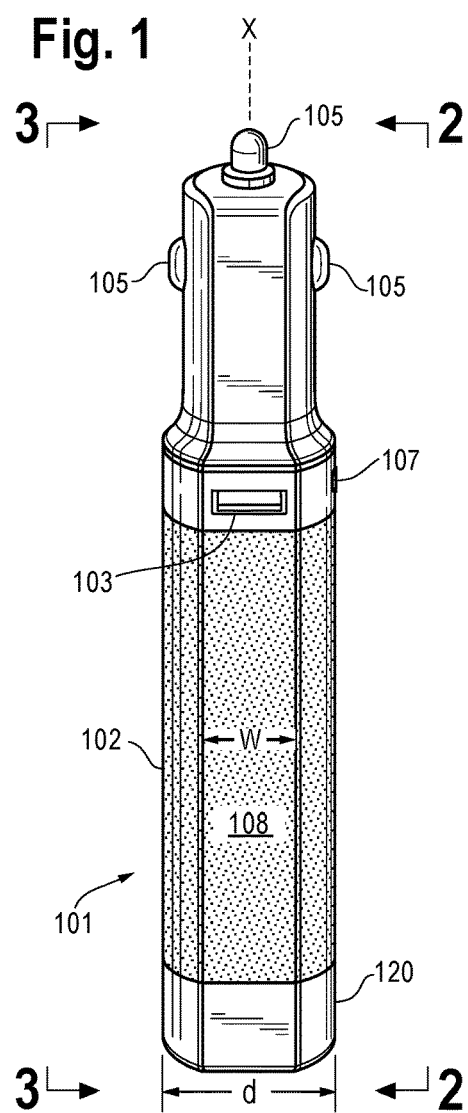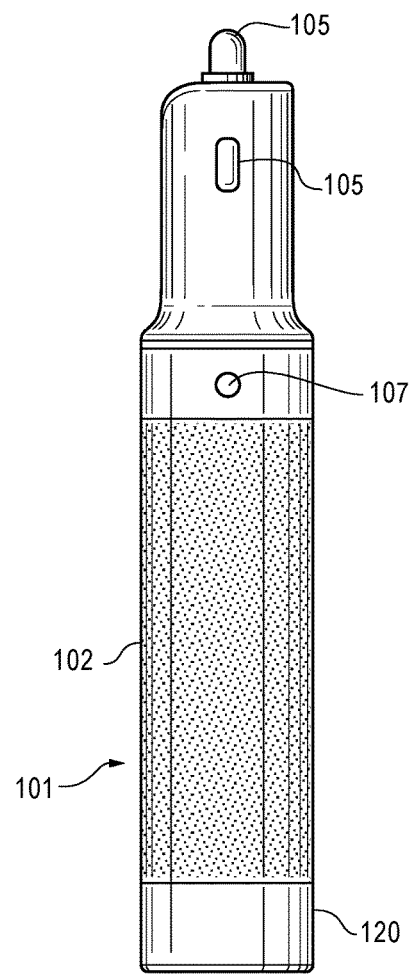

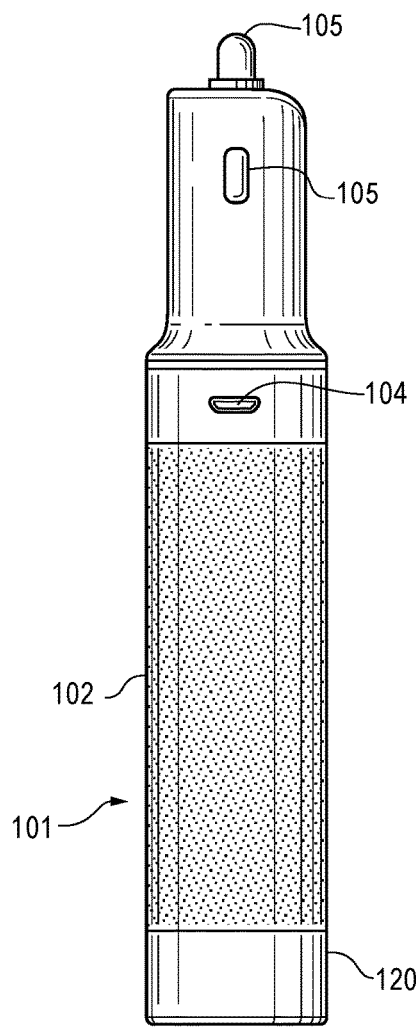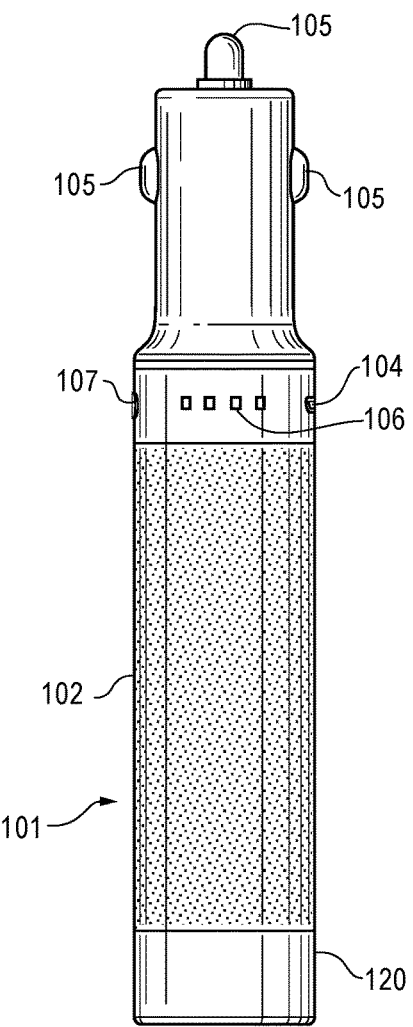

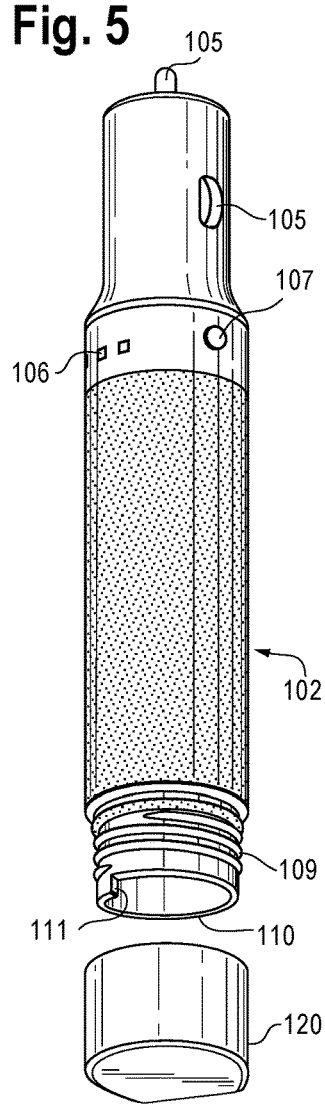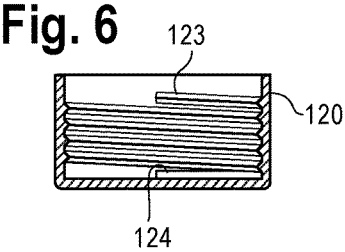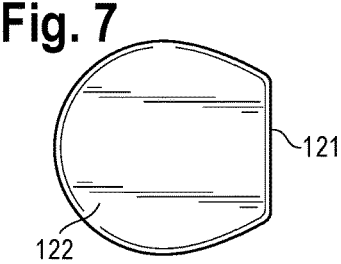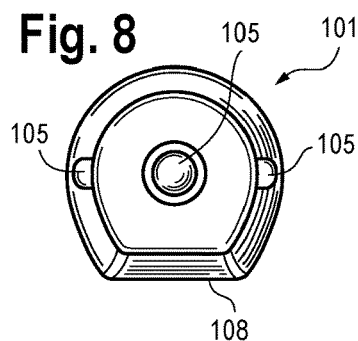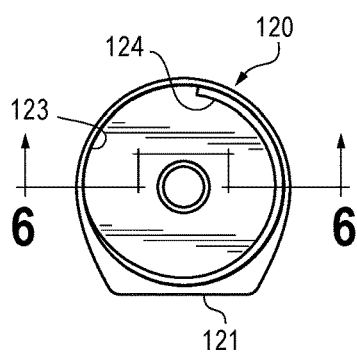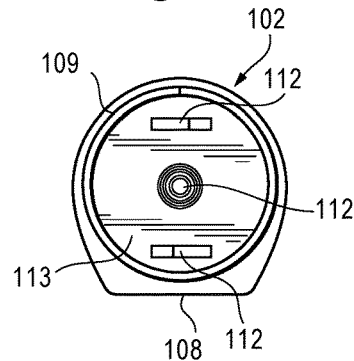

PORTABLE CHARGER AND POWER BANK

This application relates to a portable charger and power bank that can be used to charge a battery and to charge a device.

BRIEF DESCRIPTION OF THE DRAWINGS

The following drawings illustrate the concepts of the present invention. Illustrations of an exemplary device are not necessarily drawn to scale.

FIG. 1 is a front view of an embodiment of a portable charger and power bank.

FIG. 2 is a side view of the embodiment of FIG. 1, taken along 2-2 of FIG. 1.

FIG. 3 is a side view of the embodiment of FIG. 1, taken along 3-3 of FIG. 1.

FIG. 4 is a rear view of the embodiment of FIG. 1.

FIG. 5 is a perspective view of the embodiment of FIG. 1, with the end cap removed.

FIG. 6 is a partial perspective view of the inner surface of the body of the end cap of the embodiment of FIG. 1, taken along 6-6 of FIG. 9.

FIG. 7 is an end view showing the closed end of the end cap of the embodiment of FIG. 1.

FIG. 8 is a top view of the embodiment of FIG. 1.

FIG. 9 is an end view showing the open end of the end cap of the embodiment of FIG. 1.

FIG. 10 is an end view of the housing of the embodiment of FIG. 1, with the end cap and the battery removed.

DETAILED DESCRIPTION

Figure 11:
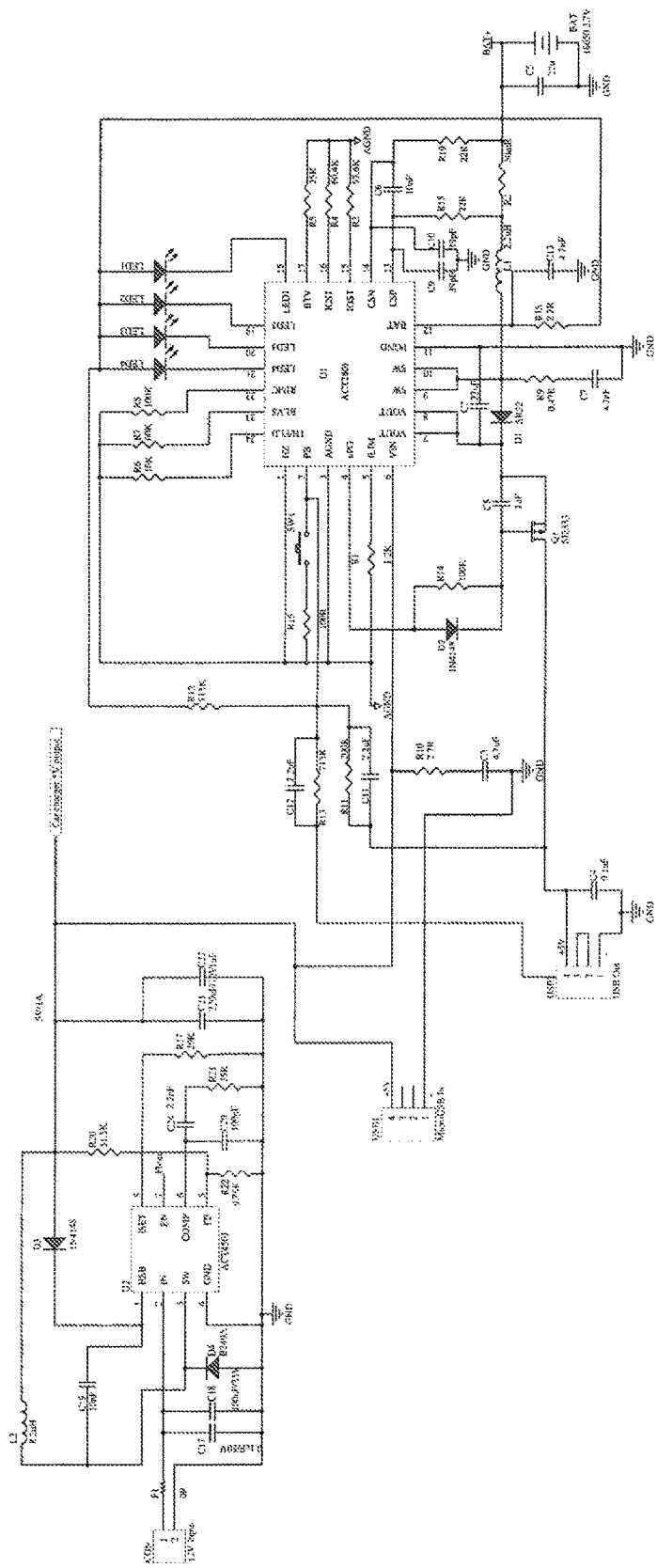
FIG. 11 is an electrical schematic of the embodiment of FIG. 1.

While the embodiments described can take many different forms, specific embodiments illustrated in the drawings will be described with the understanding that the present disclosure is to be considered an exemplification of the principles of the invention, and is not intended to limit the invention to a specific embodiment illustrated.

FIGS. 1-4 and 8 illustrate a front view, left and right side views, a rear view, and a top view, respectively, of an exemplary embodiment of a portable charger and power bank 101. As described below, it can be used to charge a device such as a cell phone through a Universal Serial Bus (USB) output port 103, to charge a battery, or both. It can receive power, when necessary, through an automobile dashboard DC voltage receptacle, or through a USB input port 104. The latter allows portable charger and power bank 101 to receive power, for example, from a computer or from wall power with appropriate rectification. FIG. 11 is an exemplary electrical schematic of the embodiment of FIG. 1.

The exemplary portable charger and power bank 101 illustrated in FIGS. 1-4 and 8 comprises a quasi-cylindrical housing 102 and an end cap 120 with a quasi-cylindrical body with an outer diameter that is substantially equal to an outer diameter "d" of the housing 102. The end cap 120 is threadingly engaged to a second end of the housing 102, so that a battery (not shown) can be inserted into, or removed from, a battery chamber 113 in the housing 102 when the end cap 120 is disengaged from the housing 102. The opposing first end of the housing 102 is adapted for insertion into an automobile dashboard DC voltage receptacle. It includes contacts 105 which circuitry electrically connects to the battery so that power supplied through the contacts 105 can recharge the battery, and to the USB output port 103 so that power supplied through the contacts 105 can charge a device. The appropriately shaped and dimensioned first end together with its contacts 105 comprises a means for receiving power from the automobile dashboard DC voltage receptacle. The circuitry described and illustrated schematically comprises a means for recharging the battery with power supplied through the input port or through the receiving means, and for charging a device connected to the output port with power available from the battery, from the input port, or from the receiving means.

As a safety measure, the circuitry is physically arranged within the housing 102 so that, if a non-rechargeable battery is inserted into the battery chamber 113, a charging voltage powered from the USB input port 104 or from the contacts 105 cannot be applied across the battery.

For example, the battery contacts 112 within the housing 102 that are electrically connected with USB input port 104 or with contacts 105 are physically located to align with both positive and negative contacts for a rechargeable 18650 battery but not to align with both positive and negative contacts for a non-rechargeable CR123A battery. A pair of CR123A batteries fits in the same cylindrical space as a rechargeable 18650 battery, but the positive and negative contacts of CR123A batteries are located at opposing ends of the batteries while the positive and negative contacts of 18650 batteries are located at the same end of the batteries. FIG. 10 is an end view of housing 102 with the end cap 120 and the battery removed, and the battery contacts 112 are seen at the end of the empty battery chamber 113.

The housing 102 also comprises a plurality of light emitting diodes (LEDs) 106, electrically arranged so that a proportion of the plurality of LEDs 106 that are emitting light is representative of a level of charge of the battery. The plurality of LEDs 106 comprises a means for indicating the level of charge of the battery. A user-activated switch 107 can initiate the LEDs 106 to emit light and to show the level of charge of the battery. The switch 107 comprises a means for a user to activate the indicating means.

As an anti-roll feature, the housing 102 includes one flat outer side 108. The end cap 120 also includes one flat outer side 121 of substantially the same width as the housing flat outer side 108. The flat outer side 108 is substantially parallel to a longitudinal axis "x" of the housing 102, and the width "w" of the flat outer side 108 is measured in a direction that is substantially perpendicular to the longitudinal axis "x". The flat sides 108 and 121 are best seen in FIG. 1 and in FIGS. 7-10. FIG. 7 is an end view showing a closed end 122 of the end cap 120. FIG. 9 is an end view showing the open end of the end cap 120 when the end cap 120 is removed from the housing 102.

As seen in FIGS. 5 and 6, the body of end cap 120 comprises a threaded cylindrical inner surface 123, and the second end of housing 102 comprises a threaded cylindrical outer surface 109 that is structured and dimensioned to threadingly engage the inner surface 123. As seen in FIG. 5, the second end of the housing 102 comprises a spiral edge with a vertical step 111. As seen in FIGS. 6 and 9, the inner surface 123 comprises a protrusion 124 that protrudes inwardly at a point close to the closed end 122. The vertical step 111 and the protrusion 124 are arranged to meet each other, and to stop further threading engagement of the end cap 120 and the second end of the housing 102, at a point at which the flat outer side 121 of the body of the end cap 120 aligns with the flat outer side 108 of the housing 102. This physical arrangement of the vertical step 111 and the protrusion 124 comprises a means for stopping further threading engagement of the end cap 120 and the second end of the housing 102, at a point at which the flat outer side 121 of the body of the end cap 120 aligns with the flat outer side 108 of the housing 102.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

The invention claimed is:

1. A portable charger and power bank, comprising:
a housing with opposing first and second ends;
an end cap, the end cap threadingly engaging the second end of the housing;
a universal serial bus (USB) input port;
a USB output port;
the housing comprising a battery chamber, wherein a battery can be inserted into, or removed from, the battery chamber when the end cap is disengaged from the second end of the housing;
the first end of the housing being adapted for insertion into an automobile dashboard DC voltage receptacle, and having electrical contacts through which power can be supplied from the automobile dashboard DC voltage receptacle; and
circuitry electrically connecting the input port, the output port, the contacts in the first end of the housing, and battery contacts in the battery chamber, so that power supplied through the input port or through the contacts in the first end of the housing can recharge the battery, and so that power available from the battery, from the input port, or from the contacts in the first end of the housing can charge a device connected to the output port;
wherein the circuitry is physically arranged in the housing so that, if a non-rechargeable battery is inserted into the battery chamber, a charging voltage powered from the input port or from the contacts in the first end of the housing cannot be applied across the battery.

2. The portable charger and power bank of claim 1, wherein
the housing is quasi-cylindrical, with one flat outer side that is substantially parallel to a longitudinal axis of the housing and that has a width in a direction substantially perpendicular to the longitudinal axis;
the end cap comprising a quasi-cylindrical body with one flat outer side;
an outer diameter of the housing and an outer diameter of the body are substantially equal; and
the flat outer side of the body is substantially parallel to the longitudinal axis, and has a width in a direction substantially perpendicular to the longitudinal axis and that is substantially equal to the width of the flat outer side of the housing.

3. The portable charger and power bank of claim 2, wherein
the end cap has an open end and a closed end;
the body of the end cap comprises a threaded cylindrical inner surface;
the inner surface comprises a protrusion that protrudes inwardly at a point that is nearer to the closed end than it is to the open end;
the second end of the housing comprises a threaded cylindrical outer surface, that is structured and dimensioned to threadingly engage the inner surface of the body of the end cap;
the second end of the housing comprises a spiral edge with a vertical step; and
the vertical step and the protrusion are arranged to meet each other, and to stop further threading engagement of the end cap and the second end of the housing, at a point at which the flat outer side of the body of the end cap aligns with the flat outer side of the housing.

4. The portable charger and power bank of claim 1, further comprising a plurality of light emitting diodes (LEDs), electrically arranged so that a proportion of the plurality of LEDs that are emitting light is representative of a level of charge of the battery.

5. The portable charger and power bank of claim 4, further comprising a user-activated switch, wherein the LEDs emitting light representative of the level of charge of the battery will emit light after the switch has been activated.

6. A portable charger and power bank, comprising:
a housing;
an end cap, the end cap threadingly engaging an end of the housing;
a universal serial bus (USB) input port;
a USB output port;
the housing comprising a battery chamber, wherein a battery can be inserted into, or removed from, the battery chamber when the end cap is disengaged from the end of the housing;
means for receiving power from an automobile dashboard DC voltage receptacle; and
means for recharging the battery with power supplied through the input port or through the receiving means, and for charging a device connected to the output port with power available from the battery, from the input port, or from the receiving means;
wherein the recharging means is physically arranged in the housing so that, if a non-rechargeable battery is inserted into the battery chamber, a charging voltage powered from the input port or from the receiving means cannot be applied across the battery.

7. The portable charger and power bank of claim 6, wherein
the housing is quasi-cylindrical, with one flat outer side that is substantially parallel to a longitudinal axis of the housing and that has a width in a direction substantially perpendicular to the longitudinal axis;
the end cap comprising a quasi-cylindrical body with one flat outer side;
an outer diameter of the housing and an outer diameter of the body are substantially equal; and
the flat outer side of the body is substantially parallel to the longitudinal axis, and has a width in a direction substantially perpendicular to the longitudinal axis and that is substantially equal to the width of the flat outer side of the housing.

8. The portable charger and power bank of claim 7, further comprising means for stopping further threading engagement of the end cap and the end of the housing, at a point at which the flat outer side of the body of the end cap aligns with the flat outer side of the housing.

9. The portable charger and power bank of claim 6, further comprising means for indicating a level of charge of the battery.

10. The portable charger and power bank of claim 9, further comprising means for a user to activate the indicating means.

* * * * *